Figure 1:
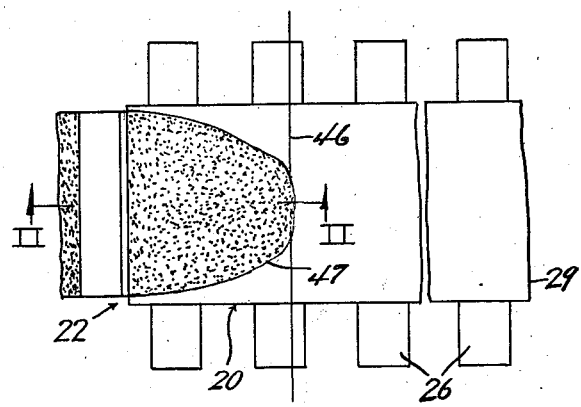

May 26, 1942.　　　　K. G. KUTCHKA　　　　2,284,398
METHOD OF AND APPARATUS FOR SUPPLYING GRANULAR MATERIAL
Filed April 11, 1940　　　　2 Sheets-Sheet 1

Inventor
KARL G. KUTCHKA
By Olew E. Bee
Attorney

May 26, 1942. K. G. KUTCHKA 2,284,398
METHOD OF AND APPARATUS FOR SUPPLYING GRANULAR MATERIAL
Filed April 11, 1940 2 Sheets-Sheet 2

Inventor
KARL G. KUTCHKA
By Olen E. Bee
Attorney

Patented May 26, 1942

2,284,398

UNITED STATES PATENT OFFICE 2,284,398

METHOD OF AND APPARATUS FOR SUPPLYING GRANULAR MATERIAL

Karl G. Kutchka, Wilkinsburg, Pa., assignor to Pittsburgh Plate Glass Company, Allegheny County, Pa., a corporation of Pennsylvania Application April 11, 1940, Serial No. 329,030

10 Claims. (Cl. 49—54)

This invention relates to the feeding of granular material, and it has particular relation to methods and apparatus for supplying superposed layers of granular material upon a molten bath.

The invention described and claimed herein is related to the invention disclosed in the applications of Howard L. Halbach, et al., Serial No. 318,878, filed February 14, 1940, and Ser. No. 329,096, filed April 11, 1940.

One object of the invention is to provide an improved method of supplying in blanket form a plurality of stratified layers of granular material upon a molten bath.

Another object of the invention is to provide an improved method of supplying in blanket form a plurality of superposed layers of different forms of granular glass forming batch upon a molten glass bath.

Another object of the invention is to provide an improved method of supplying concurrently superposed layers of granular batch and cullet upon a molten glass batch and in such manner as to insure a blanket of the superposed layers upon the bath.

Another object of the invention is to provide an improved apparatus for supplying superposed layers of glass forming material upon a glass bath.

In one form of the invention, glass forming material is supplied in the form of superposed layers, such as materials in the form of sand, soda ash, etc., mixed according to conventional glass making formula, constituting one layer, and crushed or broken glass known as cullet, constituting another layer. These materials in granular form are fed uniformly to provide a relatively thin blanket of material beginning at the entrance end of the furnace and maintaining such blanket substantially in its thin layer or blanket form as it is moved farther into the tank and progressively melted. After the material in this thin layer form has been fed into the tank, the fuel flames and the heat radiated from surrounding heated refractories causes a fritting or sintering of the upper layer surface and this action insures a coherent relation among the particles of the upper side of the granular blanket. Whatever batch or atmospheric agitation that may tend to occur from progressively incorporating the batch material in the molten bath or from the combustion of the fuel projected into the tank, does not disturb the uniformity of the blanket or raise any dust in the tank atmosphere.

Since the cullet is more susceptible to melting into the molten bath it serves as a merging medium between the bath and the upper layer of raw batch material. Hence, the stratified blanket of cullet and raw batch material is uniformly and progressively incorporated in the molten bath, and the spreading of the material over a wide area relative to its thickness provides for increased speed in melting and at lower temperatures as compared with methods heretofore proposed.

Figure 2:
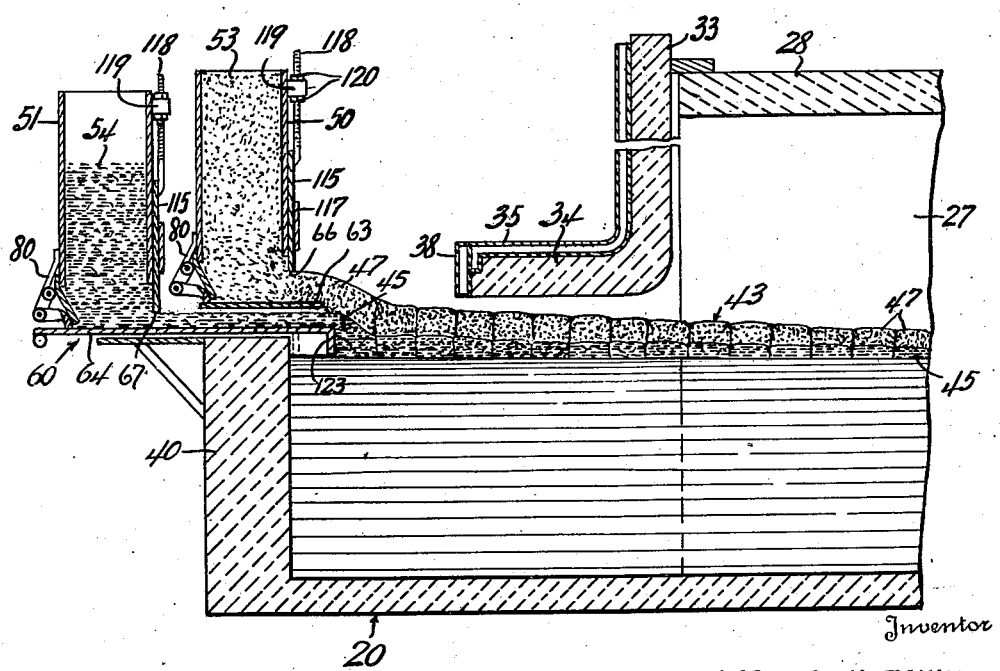
Figures 3, 4:
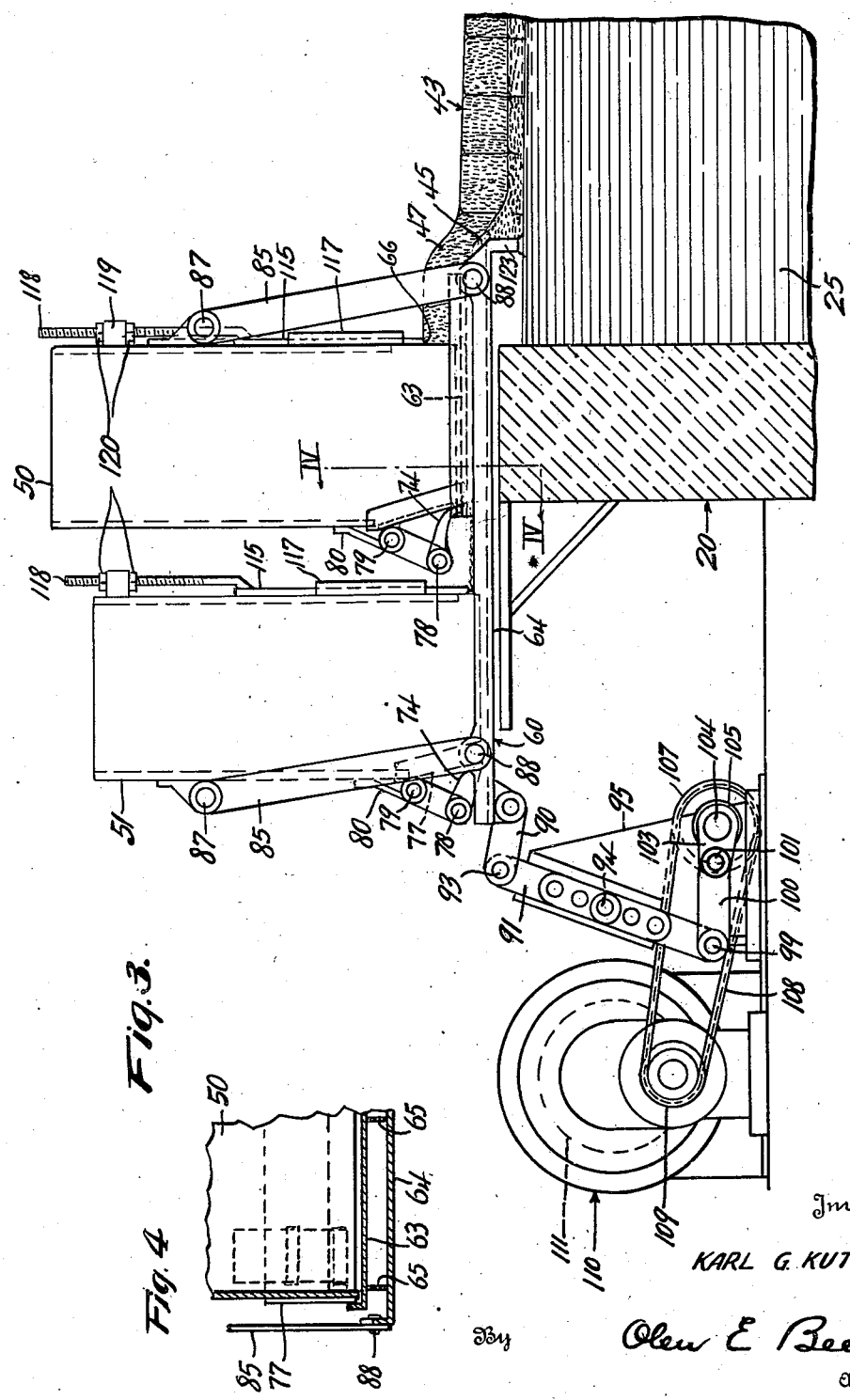

In the drawings:

Fig. 1 is a fragmentary diagrammatic plan of a tank illustrating the method of feeding granular material; Fig. 2 is a fragmentary longitudinal section taken substantially along the line II—II of Fig. 1; Fig. 3 is a fragmentary side elevation of operating parts of an apparatus employed in practicing the method described; and Fig. 4 is a fragmentary vertical section taken substantially along the line IV—IV of Fig. 3.

In practicing the invention a glass melting tank or furnace 20 is provided with an entrance extremity 22 which is almost as wide as the body of the tank. During its operation the tank contains a bath of molten glass 25 which is maintained in molten state by means of flames from suitable fuel fed through ports 26 in the tank walls 27. The tank includes a roof 28 supported upon the tank walls 27 according to well known methods of construction. In one form of apparatus known as a regenerative type of tank, the flames are played over the surface of the bath alternately at proper intervals from opposite sides of the tank. Ordinarily tanks of this general type are operated continuously and the molten bath moves toward the exit extremity 29 from which glass can be drawn in sheet form.

A rear vertical wall 33 is erected across the entrance end of the tank and is provided with a lower horizontal section 34 which has its lower surface so positioned as to be spaced in parallel relation only a short distance above the upper surface of the molten bath. Suitable coolers 35 and 36 are disposed along the outer vertical side of the wall and along its horizontal section 34. The particular construction of this vertical sectional wall does not constitute per se a part of the invention claimed herein. The outside or rear side or edge of the horizontal section 34 supporting the cooler 36 is located materially inwardly or forwardly of the plane of the rear bath retaining wall 40 of the tank.

A plural layer blanket 43, containing a lower layer 45 of cullet and an upper layer 47 of raw batch material containing silica or sand, soda a, etc., is fed uniformly upon the upper surface of the molten bath adjacent the rear end wall 40 and the blanket so formed on the surface of the bath moves underneath the horizontal wall section 34 in close proximity thereto, and thence, into the body of the tank. Flames playing over the upper surface of the uniformly spread blanket cause it to melt gradually as the glass bath moves way from the entrance extremity of the tank, and the replenishing or incoming blanket is entirely melted approximately by the time it reaches the location of the line 46, indicated in Fig. 1. This area is known as the foam line, and in response to heat applied in the tank the glass bath reaches substantially its maximum temperature in the vicinity of this line. Such maximum temperature is maintained over a limited area as the bath moves forwardly and is gradually cooled substantially to conform to the temperature required in drawing sheet glass at the exit end of the tank. The unmolten or partially melted blanket assumes the shape indicated at 47 in this figure, wherein, it will be apparent that the width and thickness of the blanket diminishes gradually as it passes farther into the tank until the batch, before it reaches the exit end of the tank, is merged into the bath in uniformly melted state.

In this manner the maximum area of each flame from the heating fuel comes in contact with the upper surface of the blanket to provide maximum heat to this surface with a minimum expenditure of fuel. The batch which passes across the space between the rear bath retaining wall 40 and the outer or rear edge of the horizontal section 34 is relatively cool on its upper side, although the hot molten glass bath is underneath, and such upper side reaches approximately a temperature of 200° to 300° F. before it is conducted beneath the horizontal section 34. However, in passing underneath the latter section, the material is heated to such extent that its upper side becomes fritted or sintered to form a continuous coherent surface of somewhat viscous consistency, but having sufficient body and strength to maintain its layer form and effectively resist buckling or distortion from forces pushing it farther into the tank.

This blanket of material thus fritted is in proper condition to receive the fuel flames thereover without danger of agitating the batch particles or raising dust therefrom. The atmospheric pressure in the tank, that is, inside or forwardly of the wall section 33, is substantially neutral, and since the lower side of the horizontal section 34 is in close proximity to the blanket passing underneath it, there will be no appreciable loss of heat at the charging end of the tank.

The blanket of batch between the bath retaining wall 40 and the outer edge of the horizontal section 34 prevents the loss of heat from the glass bath therebeneath. Likewise, the blanket extending a considerable distance into the tank insures maintenance of heat below it while, at the same time, presenting the maximum area for contact with the heating flames. These factors operate to reduce the fuel consumption, as well as to increase the efficiency of the tank.

In operating one form of mechanical construction for feeding batch material in blanket or plural layer form, a pair of hoppers 50 and 51 extending in side by side relation across the entrance end of the tank are filled with different types of material. For example, properly mixed raw batch 53 of sand, soda ash, etc., is supplied in the hopper 50 and a batch of crushed glass or cullet 54 is supplied in the other hopper 51. These types of batch later form the layers 45 and 47 previously referred to.

A laterally movable carrier 60, upon which the two types of batch material rest includes an upper plate 63 communicating with the hopper 50 and a lower plate 64 communicating with the rear hopper 51. These upper and lower plates are spaced sufficiently one above the other by means of spacers 65 rigidly secured thereto to provide for the passage of the cullet from the hopper 51 to the front edge of the plate 64. The upper plate 63 forms the bottom of the hopper 50, and the rear portion of the lower plate 64, which projects a considerable distance rearwardly beyond the upper plate, constitutes the bottom of the hopper 51. The rear wall of each hopper is provided with a lower inclined plate shield 74 and an upper inclined plate shield 77 having pivotal supports 78 and 79, respectively, along their upper portions. The upper plate is disposed at a sharper incline than the lower plate and its front edge rides upon the front portion of the lower plate shield 74 which is bent downward into scraping contact with the carrier 60. The plate shields for both the upper and lower plates 63 and 64 prevent rearward loss of batch material from the respective hoppers during movement of the carrier. A bracket 80 is secured to the rear wall of each hopper for pivotally carrying the shields.

The carrier 60 is suspended for lateral swinging movement by means of parallel links 85 which have pivotal connections 87 at their upper ends securing them to the hopper structure, and at their lower ends they have pivotal connections 88 securing them to the carrier 60 adjacent the front and rear extremities thereof. These links are equal in length and are so arranged that the plates 63 and 64 of the carrier suspended thereby are maintained in substantially horizontal position, although their level varies slightly in connection with the arcs of swinging movement about the pivotal connections 87. Oscillatably driven pivotal links 90 are connected to the rear portion of the carrier for oscillatably swinging the latter. The driving mechanism disclosed in the application of Joseph H. Redshaw, Serial No. 329,089, filed April 11, 1940, is suitable for operating the carrier. This type of mechanism includes an oscillatable lever 91 that has an upper pivotal connection 93 securing it to the rear end of the link 90 and an intermediate pivotal connection 94 adjustably carrying the lever upon a support 95. The lower end of the lever 91 has a pivotal connection 99 securing it to one end of a pitman 100 which has at its other end a pivotal connection 101 securing it to a crank arm 103 of a horizontally disposed shaft 104. Suitable bearings 105 in the support 95 rotatably support the shaft 104. Sprocket and chain gearing 107, 108 and 109 transmit power from a conventional reduction gearing unit 110 which is driven by a motor 111.

The carrier unit 60, including both plates 63 and 64, is swingable substantially horizontally across the entrance end of the tank which is substantially coincidental with the discharge opening 66 in the front wall of the hopper 50. A similar discharge opening 67 is provided in the front wall of the rear hopper 51. The speed of the swinging action of the unit 60 is relatively slow and the carrier is virtually free of vibration, or sudden or jerky movement. When the carrier unit 60 is disposed rearwardly with the batch from the front hopper 50 resting thereon, then forward horizontal movement of the plate carries with it a predetermined amount of batch in layer form. The latter batch is then disposed in a position immediately overhanging the surface of the molten bath 25 and the batch in the hopper 50 drops down upon the rear portion of the plate 63 behind the batch which has been carried forward.

The same kind of operation occurs with reference to the cullet in the hopper 51. However, in order to provide for concurrent feeding of the cullet and raw batch material the hopper 51 is filled first and the carrier 60 subjected to preliminary operation until the cullet has been moved forwardly upon the plate 64, through the space between the plates 63 and 64 to the front edge of the plate 64.

In swinging the carrier rearwardly from the position shown in full lines of Figs. 2 and 3, that is, by withdrawing the front edge of the carrier from its position above the bath, the layers 47 and 45 can not also be carried rearwardly because the space previously occupied by the material of these layers will have been filled by the batch and cullet dropping behind them in the hoppers. The front edge of the plate 63 is offset rearwardly from the front edge of the plate 64. Hence, by withdrawing the carrier 60, the cullet 54 begins to drop directly upon the surface of the batch from the front edge of the plate 64 and the raw batch 53 also begins to drop upon the cullet to form the layers 45 and 47. The blanket thus formed in superposed layers of cullet and raw batch is spread or distributed uniformly along the area corresponding in width to the distance from the forward to the rear limits of swinging or oscillation of the carrier.

In succeeding swinging movements of the plates 63 and 64 the next layers 45 and 47 will be moved forward against the first layers by the aid of a flange 123 at the forward edge of the plate 64 and in such manner as to push the first layers farther into the tank. This action is repeated intermittently at desired intervals, or constant reciprocable movement of the carrier 60 is timed in such manner as to provide for uniform feeding of the raw batch and cullet at whatever rate that is desired.

The size of the opening in the front wall of each hopper is controlled by means of an upright gate 115 of sheet metal that is vertically slidable in a guide 117 carried by the front wall of the hopper, and suitable adjusting rods 118 are disposed through the brackets 119 on the hopper, and connected to the gate for the purpose of adjustment by manipulation of nuts 120 carried on the rods on opposite sides of the brackets.

In operating the type of glass melting tank described herein, one or more glass sheets can be drawn, and the amount of batch fed by each stroke of the lever 91 and carrier 60 can be regulated according to the amount of glass drawn from the tank. Thus an exact balance between the feeding and drawing operations can be maintained and the level of the glass bath maintained constant.

Although practical construction and methods illustrative of the invention have been shown and described in detail, it will be apparent to those skilled in the art that the invention is not so limited, but that various changes can be made therein without departing from the spirit of the invention or from the scope of the appended claims.

I claim:

1. A method of supplying granular material upon a molten bath which comprises depositing a plural layer blanket of meltable granular materials of different types substantially across the width of the bath and moving said blanket in stratified form along the body of the bath, and melting the blanket of material as it moves farther along the bath.

2. A method of supplying granular material upon a molten glass bath which comprises successively supporting superposed layers of cullet and raw glass-making batch in superposed relation above a portion of the bath, relieving support of the superposed layers to permit them to fall in the same superposed relation upon the surface of the bath, moving the superposed layers farther upon the bath, and successively supplying additional superposed layers of cullet and raw batch to form a substantially continuous plural layer blanket upon the bath.

3. A method of supplying granular material upon a molten glass bath which comprises, forming a blanket of cullet and raw glass-making batch in superposed layers upon the glass bath from its marginal portion inwardly toward the central bath portion, progressively melting the material by playing flames upon the major portion of the blanket surface, and continuously replenishing the blanket as it is melted by the flames.

4. A method of supplying granular glass-making material upon a molten bath of a melting tank having entrance and exit extremities which comprises distributing a relatively thin layer of cullet substantially across the width of the tank at the entrance extremity thereof, distributing a layer of raw glass making batch upon the layer of cullet to form a stratified blanket, progressively moving the stratified blanket into the tank and melting it into the bath and uniformly replenishing the layers of cullet and raw batch in stratified blanket form and according to the rate of melting thereof in the bath.

5. In a batch feeder having a bath-containing receptacle disposed adjacent thereto for receiving on the bath granular batch in layer form, a device having a plurality of superposed batch supports movable forwardly and rearwardly into and out of position above the bath to carry forwardly layers of batch on said supports, and means for depositing the batch in superposed layers on the bath from the forward extremities of said supports as the latter are moved rearwardly.

6. In a batch feeder having a bath-containing receptacle disposed adjacent thereto for receiving on the bath granular batch in layer form, a plurality of hoppers communicating with the receptacle and extending substantially across the receptacle width, a reciprocable member constituting the bottom of each hopper and movable inwardly to a position directly overhanging the bath to carry batch into the receptacle, each hopper having a member disposed upon the upper surface of each reciprocable member and preventing rearward movement of the batch material therebeyond, one of the reciprocable members defining a partition separating the batch from adjacent hoppers while such batch is supported upon the members.

7. In a batch feeder having a bath-containing receptacle disposed adjacent thereto for receiving on the bath granular batch in layer form, a device having a plurality of superposed batch supports movable forwardly and rearwardly into and out of position above the bath to carry forwardly separate layers of batch on said supports, means suspending the device in swinging relation to provide for its forward and rearward movement, and means for depositing the batch material in stratified blanket form from the forward extremities of said supports as the latter move rearwardly.

8. In a batch feeder having a bath-containing receptacle disposed adjacent thereto for receiving on the bath granular batch in layer form, front and rear hoppers opening into the receptacle and extending substantially across the receptacle width, a swingable member having upper and lower relatively offset plates constituting the bottoms of the hoppers and swingable inwardly to a position directly overhanging the bath to carry batch material into the receptacle, said plates defining between them a passage communicating with one of the hoppers, and means for depositing the batch from the forward edges of the plates and in superposed layers upon the bath as the plates are moved rearwardly.

9. In a batch feeder having a bath-containing receptacle disposed adjacent thereto for receiving on the bath granular batch in layer form, a substantially horizontally disposed support arranged along one marginal portion of the receptacle and repeatedly swingable over the edge of the latter in close proximity thereto, said support having upper and lower plates defining a batch receiving passage between them, means for supplying batch material separately to each plate to be carried by the latter into the receptacle, parallel suspension members supporting said support to form a swing, and means for repeatedly feeding the batch from the plates in side by side stratified layers as the support repeatedly swings in a direction away from the receptacle.

10. A method of supplying granular batch upon a molten bath which comprises depositing a plural layer blanket of different types of granular batch materials upon a bath surface, moving said blanket in stratified form along the body sheet bath, and successively melting the strata of the blanket beginning with the top stratum as the blanket moves along the bath.

KARL G. KUTCHKA.